(12) United States Patent
Kroeger et al.

(10) Patent No.: US 8,068,800 B2
(45) Date of Patent: Nov. 29, 2011

(54) ADAPTIVE IMPEDANCE MATCHING (AIM) FOR ELECTRICALLY SMALL RADIO RECEIVER ANTENNAS

(75) Inventors: Brian William Kroeger, Sykesville, MD (US); Paul James Peyla, Elkridge, MD (US); Jeremy Daniel Gotwalt, Hanover, MD (US); Libin Wang, Holmdel, NJ (US); Dean Anthony Telson, West Long Branch, NJ (US)

(73) Assignee: iBiquity Digital Corporation, Columbia, MD (US)

( * ) Notice: Subject to any disclaimer, the term of this patent is extended or adjusted under 35 U.S.C. 154(b) by 457 days.

(21) Appl. No.: 12/331,731

(22) Filed: Dec. 10, 2008

(65) Prior Publication Data

US 2010/0144295 A1    Jun. 10, 2010

(51) Int. Cl.
*H04B 1/18* (2006.01)
(52) U.S. Cl. ......... 455/193.1; 455/83; 455/78; 455/107
(58) Field of Classification Search ............. 340/310.15; 333/17.3, 32; 455/82, 121, 129, 248.1, 193.1, 455/83, 78, 107
See application file for complete search history.

(56) References Cited

U.S. PATENT DOCUMENTS

| | | | |
|---|---|---|---|
| 6,526,263 B1* | 2/2003 | Saito | 455/78 |
| 6,621,365 B1* | 9/2003 | Hallivuori et al. | 331/179 |
| 6,845,126 B2* | 1/2005 | Dent et al. | 375/219 |
| 6,868,260 B2* | 3/2005 | Jagielski et al. | 455/107 |
| 6,961,368 B2 | 11/2005 | Dent et al. | |
| 6,993,297 B2 | 1/2006 | Smith, Jr. | |
| 2004/0203834 A1 | 10/2004 | Mahany | |
| 2006/0088081 A1 | 4/2006 | Withington | |
| 2007/0210899 A1 | 9/2007 | Kato et al. | |
| 2007/0285326 A1 | 12/2007 | McKinzie | |
| 2008/0007364 A1 | 1/2008 | Chiba | |
| 2008/0122553 A1 | 5/2008 | McKinzie | |

FOREIGN PATENT DOCUMENTS

| | | |
|---|---|---|
| EP | 1331742 A2 | 7/2003 |
| EP | 1234352 B1 | 3/2008 |
| WO | WO9621253 A1 | 7/1996 |
| WO | WO2008030165 A1 | 3/2008 |
| WO | WO2008133854 A1 | 11/2008 |

OTHER PUBLICATIONS

U.S. Appl. No. 11/861,479, filed Sep. 26, 2007, Peyla et al.

* cited by examiner

*Primary Examiner* — Jean Jeanglaude
(74) *Attorney, Agent, or Firm* — Robert P. Lenart, Esq.; Pietragallo Gordon Alfano Bosick & Raspanti, LLP

(57) ABSTRACT

A method of tuning an antenna circuit includes: (a) receiving a signal on an antenna, (b) producing a received signal strength indication based on the received signal, (c) using the received signal strength indication to produce a control voltage, (d) using the control voltage to control a capacitance in an antenna matching circuit, (e) changing the control voltage to minimize a ratio of a change in the received signal strength indication to a change in the control voltage and (f) repeating steps (a), (b), (c), (d) and (e). An apparatus that implements the method is also provided.

43 Claims, 6 Drawing Sheets

ADAPTIVE IMPEDANCE MATCHING (AIM) FOR ELECTRICALLY SMALL RADIO RECEIVER ANTENNAS

FIELD OF THE INVENTION

This invention relates to antenna systems, and more particularly to impedance matching in antenna systems.

BACKGROUND OF THE INVENTION

The size and aesthetics of many AM/FM receivers constrain the dimensions of their antennas and their ground planes to suboptimal limits.

For simplicity and performance, the desired size of a good-performing antenna is about one-half wavelength at the tuned frequency (e.g., a halfwave dipole). Although longer antennas can offer better antenna gain, their narrow beamwidths make them impractical for most applications. At FM frequencies, a half wavelength is about 1.5 meters, while for AM frequencies it is about 150 meters. Due to the presence of sensitivity-limiting ambient noise, which is greater at lower frequencies, it turns out that 1.5 meters is a sufficient length for both FM and AM receivers. A vertical quarter-wave whip antenna mounted over a large ground plane (e.g., a metal car body) exhibits performance similar to a halfwave dipole antenna, and affords good FM and AM reception in cars.

AM/FM receivers are available in many configurations, including automotive, tabletop, MP3 players, and cell phones. Smaller devices are typically characterized by poor signal reception, since halfwave and quarter-wave antennas are too large and impractical. An antenna size less than a half wavelength is considered electrically small. Electromagnetic interference (EMI) caused by antenna proximity to electronics, signal variability due to human body effects, and variable antenna orientation all have a significant impact on antenna performance. Because these effects are more pronounced at lower frequencies, many small devices have FM-only receivers.

The impedances of any antenna and receiver can theoretically be matched to achieve maximum power transfer. This can be realized by conjugate matching antenna and receiver impedances. Although it is well-known that conjugate matching of the antenna and receiver input impedances maximizes power transfer into the receiver, it is not necessarily optimum for receiver sensitivity. Conjugate impedance matching is practical for half wavelength antennas with relatively low reactance, and resistance nearly constant across the band, but this approach is not practical for the electrically small antennas used in many devices. The radiation and loss resistance of these antennas is very low, and the reactance is high. This high ratio of reactance to radiation resistance leads to matching techniques that maximize the voltage (not power) delivered to the receiver input.

The reactance of electrically small antennas can be tuned out using a resonant matching circuit. The Q of the resonant circuit thus formed must be held sufficiently high to increase the signal voltage to an acceptable level at the input to the receiver low noise amplifier (LNA). To achieve a sufficiently high Q, the receiver LNA must present a high parallel resistance to the antenna resonant circuit. Although higher values may be possible and could improve reception, a Q of about 30 is a practical goal for AM and FM reception.

Since a high Q circuit has a narrow bandwidth, it must be tunable across the AM or FM band as the receiver is tuned. This was common practice for AM tabletop superheterodyne receivers with internal loop antennas. The receiver mixed the RF input signal to a fixed intermediate frequency (IF) using a local oscillator (LO), mixer, and IF filter. The antenna for these receivers was either an air-loop (typical of older tube receivers) or a smaller ferrite-core loop antenna, both having similar characteristics. Since the inductance of this internal loop antenna was fixed and not significantly affected by external factors (such as the human body), a preselection filter was tuned along with the receiver LO to maintain a high Q resonant peak at the tuned frequency. This preselection filter, comprised of the loop antenna's inductance and a variable capacitance, also served as an image reject filter. Older superheterodyne receivers used a ganged-capacitor method to synchronize the preselection filter tuning with the LO tuning.

More modern receivers typically perform a similar function with varactor diodes acting as voltage-controlled capacitors. The voltage for the varactor diode of the preselection filter is derived from the tuning voltage of the LO varactor diode. Factory calibration is usually necessary for these receivers to accommodate component tolerances. Unfortunately, it is impractical for some modern receivers to utilize preselection filter tuning. The receiver IF is sometimes incompatible with this type of tuning, and calibration and consistency over operating temperature become impractical. Furthermore, external and portable antennas have time-varying impedance characteristics, making fixed factory calibration impossible.

SUMMARY OF THE INVENTION

In a first aspect, the invention provides a method of tuning an antenna circuit including: (a) receiving a signal on an antenna, (b) producing a received signal strength indication based on the received signal, (c) using the received signal strength indication to produce a control voltage, (d) using the control voltage to control a capacitance in an antenna matching circuit, (e) changing the control voltage to minimize a ratio of a change in the received signal strength indication to a change in the control voltage, and (f) repeating steps (a), (b), (c), (d) and (e).

In another aspect, the invention provides an apparatus, including an antenna, a circuit for producing a received signal strength indication based on the received signal, a processor for using the received signal strength indication to produce a control voltage, and an antenna matching circuit including a capacitance controlled by the control voltage, wherein the processor changes the control voltage to maximize signal gain by minimizing a ratio of a change in the received signal strength indication to a change in the control voltage.

In another aspect, the invention provides an apparatus including means for receiving a signal on an antenna, means for producing a received signal strength indication based on the received signal, means for using the received signal strength indication to produce a control voltage, and means for using the control voltage to control a capacitance in an antenna matching circuit, wherein the means for using the received signal strength indication to produce a control voltage changes the control voltage to maximize signal gain by minimizing a ratio of a change in the received signal strength indication to a change in the control voltage.

DETAILED DESCRIPTION OF THE INVENTION

Figure 1:
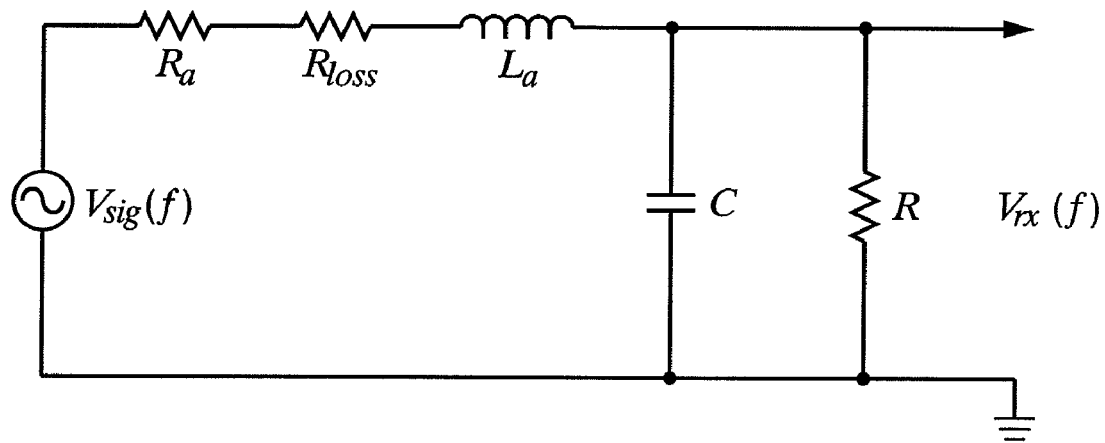
FIG. 1 is a schematic diagram of an antenna circuit filter.

In one aspect, this invention provides an Adaptive Impedance Matching (AIM) technique designed to overcome the practical limitations of current techniques, while offering superior performance. AIM is an adaptive feedback technique which attempts to maintain maximum signal gain at the tuned frequency. In one example, resonant tuning of a high Q preselection filter is achieved using a signal metric from a baseband processor. As the received signal level decreases (due to listener tuning, antenna orientation, human body effects, etc.), the baseband processor adaptively retunes the preselection filter to provide maximum signal voltage to the low noise amplifier (LNA). AIM eliminates the need for receiver calibration associated with existing preselection filter tuning techniques, and is independent of the intermediate frequency (IF), since local oscillator (LO) tracking is not performed.

For portable AM receivers, a small ferrite loopstick antenna is often the best choice. Although the sensitivity of an AM receiver with a small loopstick antenna is generally not very good, it is relatively easy to construct a varactor-tuned circuit with high Q to increase signal gain.

AM reception is especially challenging for a portable receiver. FM broadcast signals are generally transmitted with both vertical and horizontal polarization, making the receiver antenna orientation less critical than for AM, which has only vertical polarization. This makes positioning and orientation of the AM loopstick antenna more crucial than for FM. Furthermore, placement of a loopstick antenna within a receiver makes it more susceptible to EMI generated by the receiver electronics, especially at AM frequencies.

Portable and hand-held analog FM radio receivers often use an earbud wire antenna, which may be configured as either a short dipole or monopole. Although one might imagine an earbud wire as a dipole with one leg for each ear, this would yield poor performance due to the limited distance between elements of the antenna (much less than a half wavelength).

Another short dipole configuration places the antenna feed and receiver in a small accessory that clips to the listener's lapel. One leg of the dipole would extend up toward the ears, while the other would drape down to the waist where it would connect to the main device (e.g., MP3 player). This dipole configuration is not common and suffers from poor performance because it is shorter than a half wavelength.

The more common monopole earbud wire antenna requires a ground plane to replace the lower element of a dipole. Ideally, the ground plane for an FM monopole should be at least one square meter, and a ground plane the size of a metal car body is preferred. However, hand-held portable devices are typically much smaller than a quarter wavelength, which seriously compromises performance. One way to effectively increase the ground plane size is to add a meander spiral to the receiver printed circuit board (PCB). The inductive reactance of the spiral cancels some of the highly capacitive reactance of the small ground plane, thereby improving signal coupling into the receiver. Although this approach has some utility at higher frequencies, it provides little sensitivity improvement at FM (and especially AM) frequencies.

Another portable FM antenna option is a small loop located within the receiver. This is an especially attractive choice for portable FM receivers that do not use earbud wires (e.g., a wireless Bluetooth headset). Location within the receiver makes it aesthetically pleasing and easy to use. Receiver size is not important because loop antennas do not require a ground plane. On the other hand, its small size makes a loop a less-efficient signal collector than an earbud wire, and its placement within the device leaves it more susceptible to EMI. It has been shown, however, that human body proximity to a loop actually improves reception sensitivity, whereas the sensitivity of earbud wire antennas is generally degraded. Furthermore, it has been demonstrated that a small loop antenna can achieve a higher Q than an earbud wire, partially offsetting its smaller size. As a result, a loop antenna could be an attractive diversity element in a receiver that also includes an earbud wire antenna.

As stated above, a practical technique for matching electrically small antennas is to maximize the signal voltage at the receiver low noise amplifier (LNA) input. This can be done by conjugate matching the antenna and receiver input reactances. The Q of the resulting parallel resonant circuit determines the voltage delivered to the receiver LNA. Resonant circuit Q is largely determined by the LNA parallel input resistance. The higher the input resistance, the higher the Q, and therefore the higher the signal voltage. Of course, resistor noise also increases with receiver input resistance, so the net effect of Q on reception sensitivity is not as pronounced.

Consider a small square loop antenna in free space connected to a receiver with a high-impedance input. This configuration can be modeled as the resonant antenna circuit filter shown in FIG. 1. Resistors $R_a$ and $R_{loss}$ represent the radiation and loss resistances of the loop antenna, and inductor $L_a$ represents the loop inductance. R is the parallel input resistance of the LNA, and C is the sum of the LNA input capacitance and any additional capacitance needed to tune out the inductive reactance of the antenna.

The transfer function of this antenna circuit filter is:

$$H_a(f) = \frac{R}{R + R_a + R_{loss} - (2\pi \cdot f)^2 \cdot R \cdot L_a \cdot C + j \cdot 2\pi \cdot f \cdot [R \cdot C \cdot (R_a + R_{loss}) + L_a]}.$$

Evaluating at resonance, the magnitude of the antenna circuit filter transfer function is:

$$|H_a(f_{res})| = \left| \frac{R}{R + R_a + R_{loss} - (2\pi \cdot f)^2 \cdot R \cdot L_a \cdot C + j \cdot 2\pi \cdot f \cdot [R \cdot C \cdot (R_a + R_{loss}) + L_a]} \right|_{f=\frac{1}{2\pi \cdot \sqrt{L_a \cdot C}}} = \left| \frac{R}{R_a + R_{loss} + j \cdot 2 \cdot \pi \cdot f_{res} \cdot [R \cdot C \cdot (R_a + R_{loss}) + L_a]} \right|.$$

Since the loop is small, its radiation and loss resistance can be considered negligible. In this case, FIG. 1 becomes a simple parallel resonant circuit and the magnitude of the antenna circuit filter transfer function at resonance reduces to:

$$|H_a(f_{res})| = \left|\frac{R}{j \cdot 2 \cdot \pi \cdot f_{res} \cdot L_a}\right| = \frac{R}{X_L} = Q \qquad (1)$$

where Q is the quality factor of the parallel resonant circuit. This indicates that the gain of the small loop antenna circuit filter at resonance is equal to its Q.

All antennas have an effective height $h_e$ which, when multiplied by the electric field strength E, yields the open circuit induced antenna voltage:

$$V_{sig}(f) = E \cdot h_e(f).$$

The effective height of a loop antenna depends upon the frequency f in Hz, loop area A in square meters, permeability $\mu_{ec}$, and number of turns N:

$$h_e(f) = \frac{2\pi \cdot f \cdot N \cdot A \cdot \mu_{ec}}{c}$$

where $c = 3 \times 10^8$ m/s is the speed of light. For air-loop antennas, $\mu_{ec} = 1$.

From FIG. 1, it is evident that the LNA input voltage $V_{rx}(f) = V_{sig}(f) \cdot H_a(f)$. Then the voltage at the LNA input at resonance is given by:

$$V_{rx}(f_{res}) = \frac{2\pi \cdot f_{res} \cdot N \cdot A \cdot Q \cdot E}{c}. \qquad (2)$$

Figure 2:
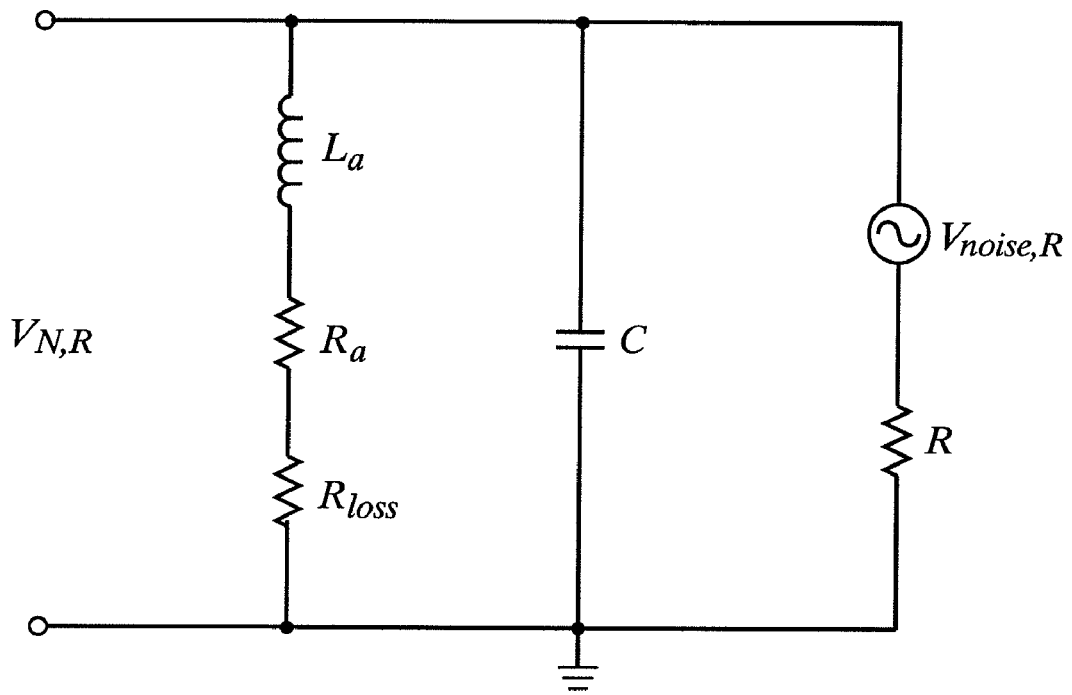
FIG. 2 is a schematic diagram modeling resistor noise in an antenna circuit filter.

Reception sensitivity is a function of not only the gain of the antenna circuit filter, but also of the LNA, resistor, and ambient noise. For an electrically small loop antenna, the radiation resistance is very low, so the ambient noise can be considered negligible. Furthermore, one can assume that the resistor noise dominates the LNA noise in a well-designed receiver. The antenna circuit filter used to determine the resistor noise contribution in the small loop antenna configuration is shown in FIG. 2. The resistor noise is modeled as an ideal voltage source $V_{noise,R}$ in series with a noiseless resistor R.

The transfer function of the resistor noise antenna circuit filter is:

$$H_{N,R}(f) = \frac{R_a + R_{loss} + j \cdot 2\pi \cdot f \cdot L_a}{R + R_a + R_{loss} - (2\pi \cdot f)^2 \cdot R \cdot L_a \cdot C +} \\ j \cdot 2\pi \cdot f \cdot [R \cdot (R_a + R_{loss}) \cdot C + L_a]$$

Again, assuming negligible radiation and loss resistance for the small loop antenna, and evaluating at resonance, $$|H_{N,R}(f_{res})| = \left|\frac{j \cdot 2\pi \cdot f_{res} \cdot L_a}{j \cdot 2\pi \cdot f_{res} \cdot L_a}\right| = 1.$$

From FIG. 2, the resistor noise voltage density $V_{N,R}$ at the LNA input is the product of the open circuit resistor noise voltage $V_{noise,R}$ and the transfer function of the resistor noise antenna circuit filter:

$$V_{N,R}(f) = |H_{N,R}(f)| \cdot V_{noise,R}.$$

The open circuit noise voltage of a resistor R is given by the well-known relation:

$$V_{noise,R} = \sqrt{4 \cdot k \cdot T_0 \cdot R}$$

where $k = 1.38 \times 10^{-23}$, J/K is Boltzmann's constant, and $T_0 = 290$ degrees Kelvin is room temperature. For the small loop antenna, $|H_{N,R}(f)|$ is unity at resonance, so the resistor noise voltage density at the LNA input is:

$$V_{N,R} = \sqrt{4 \cdot k \cdot T_0 \cdot R}. \qquad (3)$$

Reception sensitivity is defined as the electric field strength needed to achieve a desired signal-to-noise ratio at the receiver LNA input. Using equations (2) and (3), the signal-to-noise ratio at the LNA input for a small loop antenna is:

$$SNR = \frac{V_{rx}^2}{V_{N,R}^2} = \frac{\left(\frac{2\pi \cdot f_{res} \cdot N \cdot A \cdot Q \cdot E}{c}\right)^2}{4 \cdot k \cdot T_0 \cdot R}.$$

Solving for reception sensitivity E:

$$E = \frac{c \cdot \sqrt{4 \cdot k \cdot T_0 \cdot R \cdot SNR}}{2\pi \cdot f_{res} \cdot N \cdot A \cdot Q}.$$

For a parallel resonant circuit:

$$Q \equiv \frac{R}{X_L}.$$

Using this definition to substitute for R in the previous expression for E yields:

$$E = \frac{c}{N \cdot A} \cdot \sqrt{\frac{4 \cdot k \cdot T_0 \cdot SNR \cdot L_a}{2\pi \cdot f_{res} \cdot Q}}. \qquad (4)$$

Equation (1) indicates that, for a small loop antenna at resonance, the received signal gain is equal to the Q of the antenna circuit filter. However, equation (4) shows that reception sensitivity improves only as the square-root of Q, due to effects of resistor noise. Thus, one would expect that for a received signal level increase at the LNA input of N dB, the net sensitivity increase would be only N/2 dB. Although illustrated for a small loop antenna, this relationship between signal gain and sensitivity applies in general to all antenna types. So the sensitivity of the receiver in dB includes a 10·log(Q) term.

Adaptive Impedance Matching

Although high Q antenna circuit filters can improve signal gain and reception sensitivity, they must be accurately tuned. The higher the Q, the more demanding are the tuning requirements. Antenna reactance can be variable and unpredictable, depending on listener movement and relative orientation of the antenna to the human body. As a result, impedance matching to the receiver is generally very lossy.

To overcome this problem, existing portable receivers often include the antenna in a docking station. This solution is undesirable, however, because the antenna element is not portable and cannot travel with the listener.

It is desirable to have an antenna design that overcomes these and other problems, particularly for use with a portable, hand-held receiver for receiving analog and digital radio broadcast signals.

Figure 3:
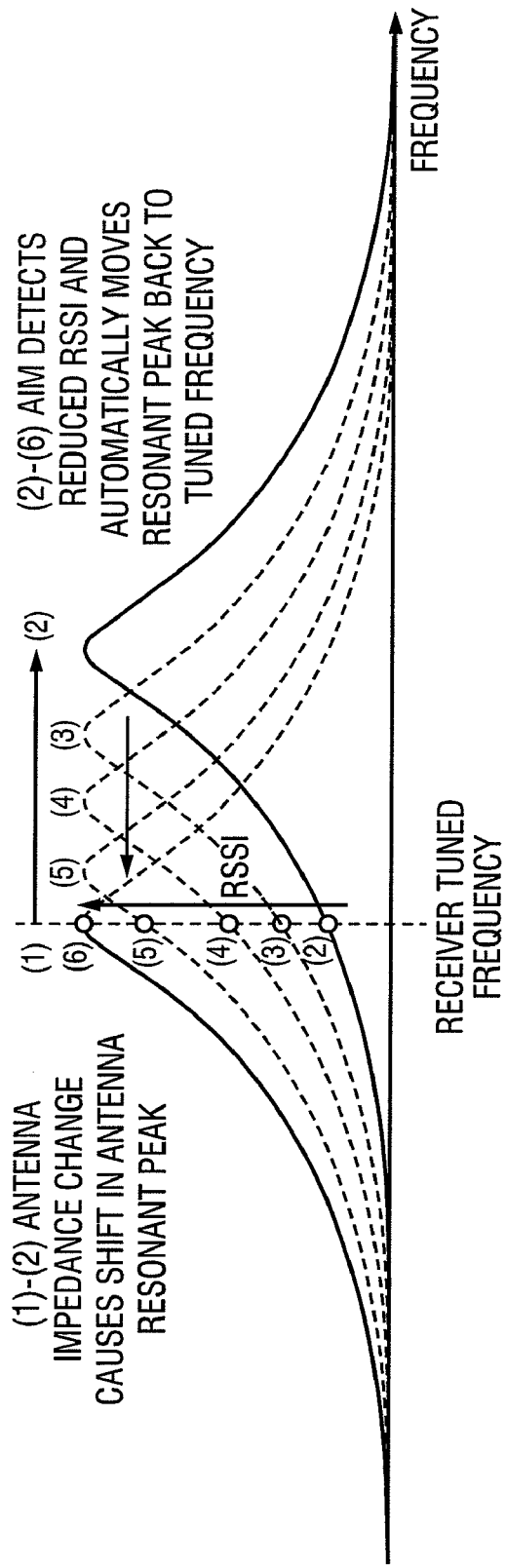
FIG. 3 is a graph of received signal strength versus frequency.

Resonant tuning of a high Q circuit can be achieved by controlling the voltage applied to a varactor diode with variable capacitance depending upon this voltage. As the received signal quality degrades (due to listener tuning, antenna impedance changes, human body effects, etc.), the receiver adaptively retunes the circuit with the tuning voltage to provide maximum signal voltage to the LNA. This process, referred to as Adaptive Impedance Matching (AIM), is illustrated in FIG. 3. In FIG. 3, the resonant peak occurs at the receiver tuned frequency when the received signal strength indication (RSSI) is at level (1). As the RSSI changes, the resonant peak shifts as shown in FIG. 3.

Figure 4:
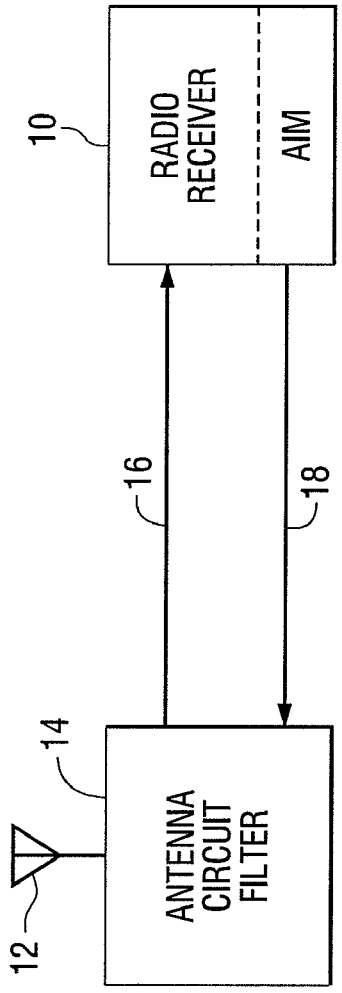
FIG. 4 is a block diagram of a radio receiver and an antenna.

The AIM seeks to maximize antenna gain at the receiver tuned frequency. A feedback control loop is used to accomplish this goal. A simplified, generic functional block diagram of a receiver 10, antenna 12, and antenna circuit filter 14 is shown in FIG. 4. Antenna circuit filter replaces the preselection tuning function of some existing receivers. A signal on line 16 from the antenna circuit filter is used to produce an antenna tuning control signal on line 18. The diagram shows that the antenna tuning control signal is derived from an AIM algorithm within the receiver, instead of tracking an LO voltage, as in superheterodyne receivers using a preselection filter.

Figure 5:
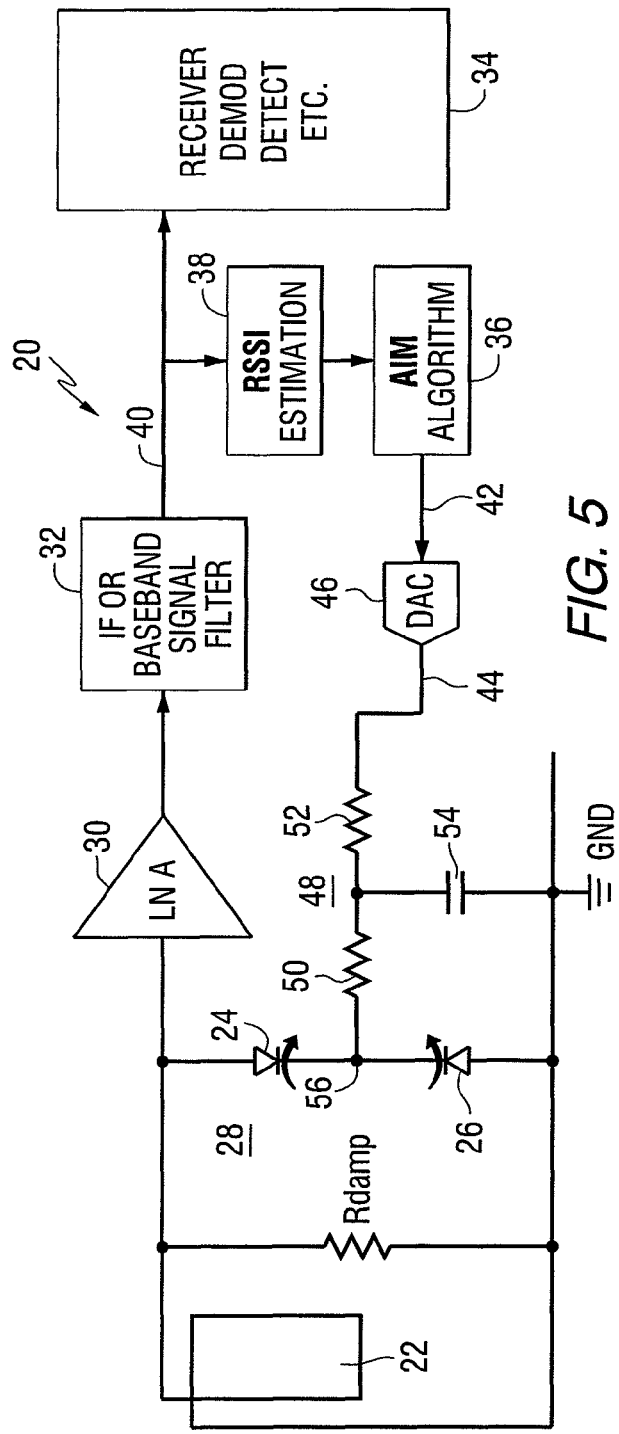
FIG. 5 is a block diagram of a radio receiver and an antenna.

FIG. 5 is a functional block diagram of a receiver 20 with a loop antenna 22 tuned by varactor diodes 24, 26 under AIM feedback control. A loop antenna is used here as a generic example, appropriate for either FM or AM applications. Electrically small antennas, typically having low radiation resistance and high reactance (e.g., a small internal loop antenna), can often be tuned with a varactor-controlled tuning circuit 28. This circuit is tuned to provide a resonance gain peak at, or very near, the center frequency of the desired input signal.

The tuned antenna circuit filter is comprised of the inductance L of the loop antenna and the capacitance C of the varactor diodes, along with any other stray capacitance or inductance, including human body effects. A damping resistor $R_{damp}$, in concert with the LNA input resistance, is used to set the Q of the tuned circuit.

The receiver is shown to include a low noise amplifier 30 having a high input impedance, an IF or baseband signal filter 32 and other components commonly found in receivers such as a demodulator, detector, etc. as shown in block 34. Tuning the antenna circuit filter to a desired frequency is accomplished by applying a voltage to a varactor diode that provides the appropriate capacitance for the tuned frequency. This tuning control voltage is the feedback signal generated by the AIM algorithm, shown in block 36. The AIM algorithm receives a received signal strength indication (RSSI) estimation 38 from the filtered IF or baseband signal on line 40. The AIM algorithm outputs a control value on line 42, which is converted to an analog control voltage on line 44 by a digital-to-analog converter 46. The analog control voltage is filtered by a filter 48, comprised of resistors 50, 52 and capacitor 54 to produce a filtered control voltage at point 56. A back-to-back varactor diode pair, as shown in FIG. 5, is preferred over a single varactor, to improve linearity.

Assuming negligible radiation and loss resistance, the simple loop antenna circuit shown in the example of FIG. 5 has a transfer function of:

$$H_a(f, R, L, C) = \frac{R}{R - 4 \cdot \pi^2 \cdot f^2 \cdot L \cdot C \cdot R + j \cdot 2 \cdot \pi \cdot f \cdot L}.$$

The resonant frequency fres is defined as the frequency where the transfer function is real. The imaginary portion of the complex transfer function can be set to zero to arrive at the well-known result for fres.

Set Re$\{H_a(fres, R, L, C)\} = 0$, then solve for $fres$.

$$\frac{R \cdot (R - 4 \cdot \pi^2 \cdot fres^2 \cdot L \cdot C \cdot R)}{(R - 4 \cdot \pi^2 \cdot fres^2 \cdot L \cdot C \cdot R)^2 + (2 \cdot \pi \cdot fres \cdot L)^2} = 0$$

$$fres = \frac{1}{2 \cdot \pi \cdot \sqrt{L \cdot C}}.$$

However, the resonant frequency is not necessarily the peak magnitude of the transfer function, but it is generally close to it, especially for high Q circuits. The AIM algorithm attempts to find the peak of the magnitude of the tuned circuit. The magnitude of the transfer function is:

$$|H_a(f, R, L, C)| = \frac{R}{\sqrt{(R - 4 \cdot \pi^2 \cdot f^2 \cdot L \cdot C \cdot R)^2 + (2 \cdot \pi \cdot f \cdot L)^2}}.$$

Its peak frequency is found by setting its derivative to zero, then solving for the frequency fpeak.

$$\frac{d}{df}|H_a(f, R, L, C)| =$$

$$\frac{R \cdot [8 \cdot \pi^2 \cdot f \cdot L^2 - 16 \cdot \pi^2 \cdot f \cdot C \cdot L \cdot R \cdot (R - 4 \cdot \pi^2 \cdot f^2 \cdot L \cdot C \cdot R)]}{2 \cdot [(R - 4 \cdot \pi^2 \cdot f^2 \cdot L \cdot C \cdot R)^2 + (2 \cdot \pi \cdot f \cdot L)^2]^{\frac{3}{2}}}$$

Solving for fpeak when $$\frac{d}{df}|H_a(fpeak, R, L, C)| = 0;$$

$$fpeak = \frac{\sqrt{4 \cdot C \cdot L \cdot R^2 - 2 \cdot L^2}}{4 \cdot \pi \cdot C \cdot L \cdot R}.$$

However, the quantity of interest is the capacitance C required to maximize the magnitude of the gain at the tuned frequency fdes. Solving for capacitance yields:

$$\frac{d}{dC}|H_a(f, R, L, C)| = \frac{4 \cdot \pi^2 \cdot f^2 \cdot L \cdot R^2 \cdot (R - 4 \cdot \pi^2 \cdot fpeak^2 \cdot L \cdot C \cdot R)}{[(R - 4 \cdot \pi^2 \cdot f^2 \cdot L \cdot C \cdot R)^2 + (2 \cdot \pi \cdot f \cdot L)^2]^{\frac{3}{2}}}$$

$$C = \frac{1}{4 \cdot \pi^2 \cdot fdes^2 \cdot L}.$$

In this case the magnitude peak of the transfer function is achieved when C is selected at the true resonance frequency, or fdes=fres. This is due to the fact that Q changes with C. Since the AIM algorithm generates a control voltage (CV), that is applied to the varactor, it is useful to express the capacitance of the varactor as a function of the AIM feedback control voltage CV.

$C = Cvaractor(CV)$; then the inverse function can be expressed as $$CV = Cvaractorinv(C).$$

The target feedback control voltage to maximize the tuned circuit gain at frequency fres in this example is then:

$$CV = Cvaractorinv\left(\frac{1}{4 \cdot \pi^2 \cdot fdes^2 \cdot L}\right).$$

If all conditions of the circuit are known and constant, as in this example, then it is relatively straightforward to develop a circuit (especially under digital control) to provide the appropriate control voltage CV for each desired tuned frequency fdes, according to the expression above.

This technique can be used for antennas with fixed characteristics, while component tolerances can be accommodated with factory calibration. Although variations with temperature can still be a concern, limiting the value of Q (and some performance) may suffice to accommodate parameter variation. This technique is typical for preselection filters of superheterodyne receivers.

However, portable antennas can have greatly varying impedances. Human body effects, small ground planes, and varying antenna characteristics due to movement and orientation (e.g., earbud wire), make this technique impractical without some means to adapt to the varying impedance characteristics.

The AIM Algorithm

The AIM algorithm is included in a feedback control loop which adaptively determines the control voltage feedback signal needed to maximize the signal gain at the desired frequency. Unlike the analytical derivation for the required control voltage CV presented above, there is no practical method to directly compute the appropriate CV for the tuned circuit with unknown or varying impedance parameters in this nonstationary process. Therefore, an indirect heuristic algorithmic approach is taken to dynamically solve for CV.

A Received Signal Strength Indication (RSSI) estimation or measurement is used to indicate the signal and noise level in the tuned signal bandwidth of the receiver. This RSSI is used as a proxy for the gain of the tuned circuit. The RSSI can be estimated by computing the (near) instantaneous power of the input signal in a digital signal processor (DSP)-type device. Other techniques for estimating RSSI, such as diode/capacitor detectors used in analog AGC control circuits, are also possible for some receiver implementations. RSSI samples can be computed over discrete time intervals, for example. For the purposes of adjusting a multiplicative gain in this case, it is convenient to compute RSSI(k) in dB as the log of the sum of the energies of a plurality of signal samples r(t) of the received and filtered signal in the interval k, that is:

$$RSSI(k) = 10 \cdot \log\left(\sum_{n=0}^{N-1} |r(n+k \cdot N)|^2\right)$$

where $$r(t) = [a(t) \cdot s(t) + n(t)] \cdot he(fdes) \cdot |H_a(fdes)|.$$

In the above equations, n is n-th sample of the N signal samples comprising RSSI interval k, he is the effective height of the antenna, and $H_a$ is the transfer function of the antenna circuit.

The received signal includes a desired signal s(t), if present, scaled by the channel gain a(t), with additive noise n(t), and the antenna circuit gain comprising the product he(fdes)·|$H_a$(fdes)| of the effective height of the antenna and the tuned circuit filter, both approximated at their desired center frequencies fdes. The goal of the heuristic AIM algorithm is to solve for the desired CV which maximizes the gain of the tuning circuit at the desired frequency. The solution for CV involves a stochastic derivative expression for the non-stationary process, that is:

$$\text{Find } CV \text{ for } E\left\{\frac{d(RSSI)}{d(CV)}\right\} = 0.$$

The AIM algorithm, in effect, varies the value of CV such that the expected value of this derivative over sufficiently small time-spans (or time averaging) tends toward zero. The antenna tuning parameters experience little variation over the time interval wherein CV is near-stationary. The solution for CV is continually updated to allow it to provide a solution when the tuning parameters are slowly changing.

In one example, the algorithm is implemented using discrete RSSI differences, instead of d(RSSI); in addition, d(CV) is replaced with a change in CV by an amount delta, having a ±1 polarity, or direction, at each interval. The stochastic derivative is modified to be the solution to a stochastic difference equation, that is:

Find CV for $$E\left\{\frac{RSSI(k) - RSSI(k-1)}{CV(k) - CV(k-1)}\right\} = 0;$$

over a sliding span of k,
where CV(k)=CV(k−1)+direction·delta,
Notice that CV must change every sample to avoid division by zero.

The Heuristic Solution

The AIM algorithm adaptively varies CV, with the goal of maximizing the varying RSSI values, by seeking zero RSSI differences. This feedback loop also accommodates changes in antenna tuning circuit parameters due to antenna movement and human body effects, for example. The feedback control algorithm is an heuristic approximation to solving the problem of changing the control voltage to minimize the ratio of a change in the received signal strength indication to a change in the control voltage.

AIM is a peak-maintaining feedback control loop, attempting to maximize the RSSI with the appropriate values of CV. It is the heuristic approach to the solution to the stochastic derivative expression above. Feedback control techniques for tracking maxima (i.e., peaks of RSSI) or minima are inherently more difficult than tracking a parameter that monotonically crosses the target value (or zero), such as a PLL. This is because the peak-finding algorithm, in effect, operates on the derivative of the function to be maximized.

The above process converts the peak of the function to a zero crossing function whose derivative is zero at its peak, and monotonically crosses the zero value. The derivative is generally noisier than the original function. The derivative, or difference in this case, also requires dynamic action of the controlled variable to estimate its change with respect to time. This dynamic action generally results in dither of the feedback control signal, resulting in variations (i.e., of RSSI) about its peak value. The peak value of the RSSI may vary due to other effects on the signal and noise that are not due to antenna tuning. The AIM algorithm must also accommodate these conditions.

Several assumptions are made about the elements supporting the AIM algorithm to aid in defining its operational characteristics. It is assumed that the tuning circuit resonant peak frequency is unique, so there is only one peak over the varactor control voltage range for a given frequency at a point in time. However, this peak can move both in frequency and in amplitude with movements of the receiver and antenna. The RSSI values may also vary due to fading, automatic gain control (AGC), or other effects.

Some algorithmic functions and parameter settings deal with the dynamics of the RSSI. In one example, the AIM algorithm is implemented as a periodic repetitive process, although strict periodicity is not a requirement. For portable FM or AM broadcast receivers, the AIM algorithm can be updated on the order of roughly 10 cycles per second. The sequence within each cycle is as follows:

1. The RSSI is measured at the start of the cycle.
2. The AIM algorithm computes the next control voltage value CV.
3. This control voltage CV is filtered to produce CVF and applied to the varactor diodes.
4. The remaining portion of the cycle allows for settling time of the CV filtering, so that the tuned circuit has reached a near-stable state for the next cycle.

Figure 6:
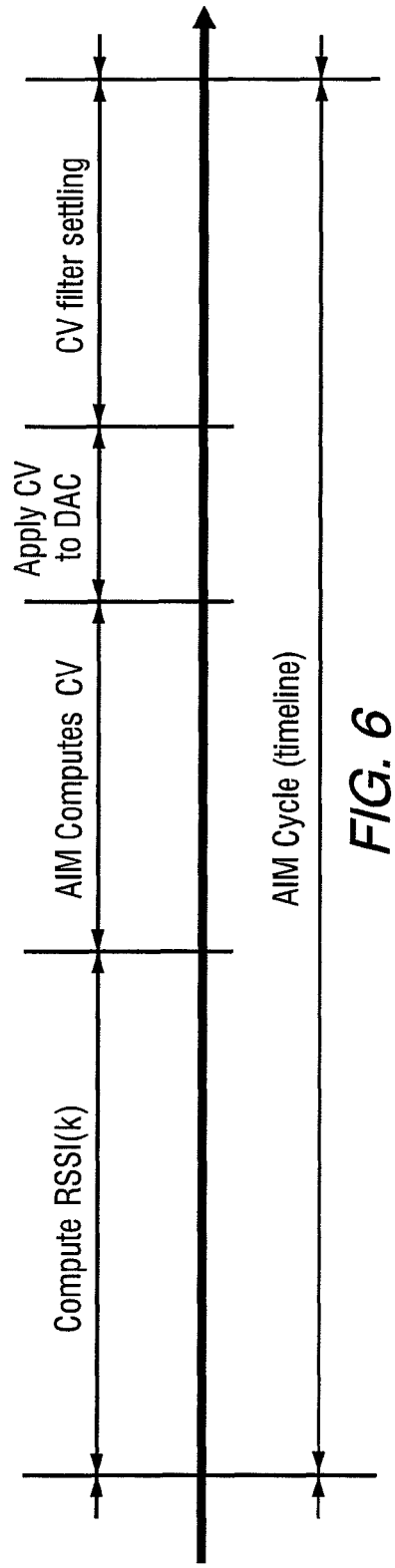
FIG. 6 is a schematic representation of an adaptive impedance matching cycle.

This AIM cycle is illustrated schematically (not to scale) in FIG. 6.

More details of an implementation of the heuristic AIM algorithm are presented next. Assume that the receiver (not yet the antenna tuning circuit) is tuned to the desired signal frequency, and RSSI values are periodically computed at each cycle. Also assume that the RSSI values are maximized when the varactor control voltage CVF is near a particular value which causes a resonant peak of the antenna tuning circuit at the desired frequency. However, CV is initialized at some other value, perhaps at the center of its range. Define a variable delta, and a binary value direction (+1 or −1), which are intermediate variables used in the AIM algorithm. The AIM algorithm outputs a new control voltage CV at each cycle. The filtering of CV to produce CVF is used to avoid the introduction of phase and amplitude steps into the desired signal. The filtering should smooth these steps so that it minimizes the impact on demodulation performance, and it is especially important for coherent demodulation. A 2-pole filter is preferred (over a 1-pole filter) to ensure continuous slope smoothing immediately after the step.

A simplified AIM algorithm is described first, then additional complexity is added to deal with the special conditions. A single AIM simple cycle can be described as follows:

---

"AIM_simple algorithm cycle"
input RSSI
if ( RSSI < RSSIprev ), then direction = −direction
RSSIprev = RSSI
CV = CV + direction* delta .

---

The AIM simple algorithm cycle example simply changes the direction of the control voltage delta (also referred to as an increment) when it detects that the signal level (RSSI) is decreasing. Ideally, in the absence of noise or other effects, CV and the corresponding resonance peak of the antenna circuit will move in the direction that increases successive RSSI values until the tuning peak frequency passes the desired frequency. After the resonance peak passes the desired frequency, the RSSI value will decrease, changing the direction of CV and the resonance peak. Then CV will continue to dither, or vary from side to side, about the peak.

Notice that the CV must change every AIM cycle (by an increment or step value delta); otherwise, there would be no useful information on the slope of the RSSI. The size of the increment or delta determines the span of dithering around the resonant peak. In a real system with noise and other factors that dynamically affect RSSI, the dithering span tends to be larger. Low Q antenna circuits will result in a greater dither span than high Q circuits. Also the dithering may cause CV to reach the extreme limiting values and get stuck, because RSSI does not change. So some modifications to the AIM algorithm are needed for a practical implementation.

The variable CV, previously considered as the analog control voltage applied to the varactor diodes, being the same as the AIM control voltage will now be considered an integer, since it is used to set the voltage output of a Digital-to-Analog-Converter (DAC). We will now distinguish this variable label CV from the analog filtered control voltage by defining the variable CVF. CVF is the actual voltage applied to the varactor diodes, a filtered version of CV. For this example, assume an 8-bit DAC, where $0 \leq CV \leq 255$. However, there may be some implementations where the range of CV results in resonant frequencies that are too far out of band. To avoid potential undesirable effects when the tuning range is much larger than the FM or AM band, some other more restrictive limits can be placed on CV, i.e., $CVmin \leq CV \leq CVmax$. The following modified AIM algorithm shown below addresses these concerns.

---

" AIM algorithm cycle"
input RSSI   ; " RSSI is rounded or truncated to nearest 0.25 dB"
if ( RSSI < RSSIprev) OR (CV = CV min ) OR ( CV = CV max )

$$\text{then delta} = \max\left(1, \frac{3}{4} \cdot \text{delta}\right)$$

direction = −direction
else $$\text{delta} = \min\left(\frac{CVmax - CVmin}{8}, \frac{9}{8} \cdot \text{delta}\right)$$

RSSIprev = RSSI
CV = min(CVmax,max(CVmin ,CV + direction · round ( delta ))).

---

Figure 7:
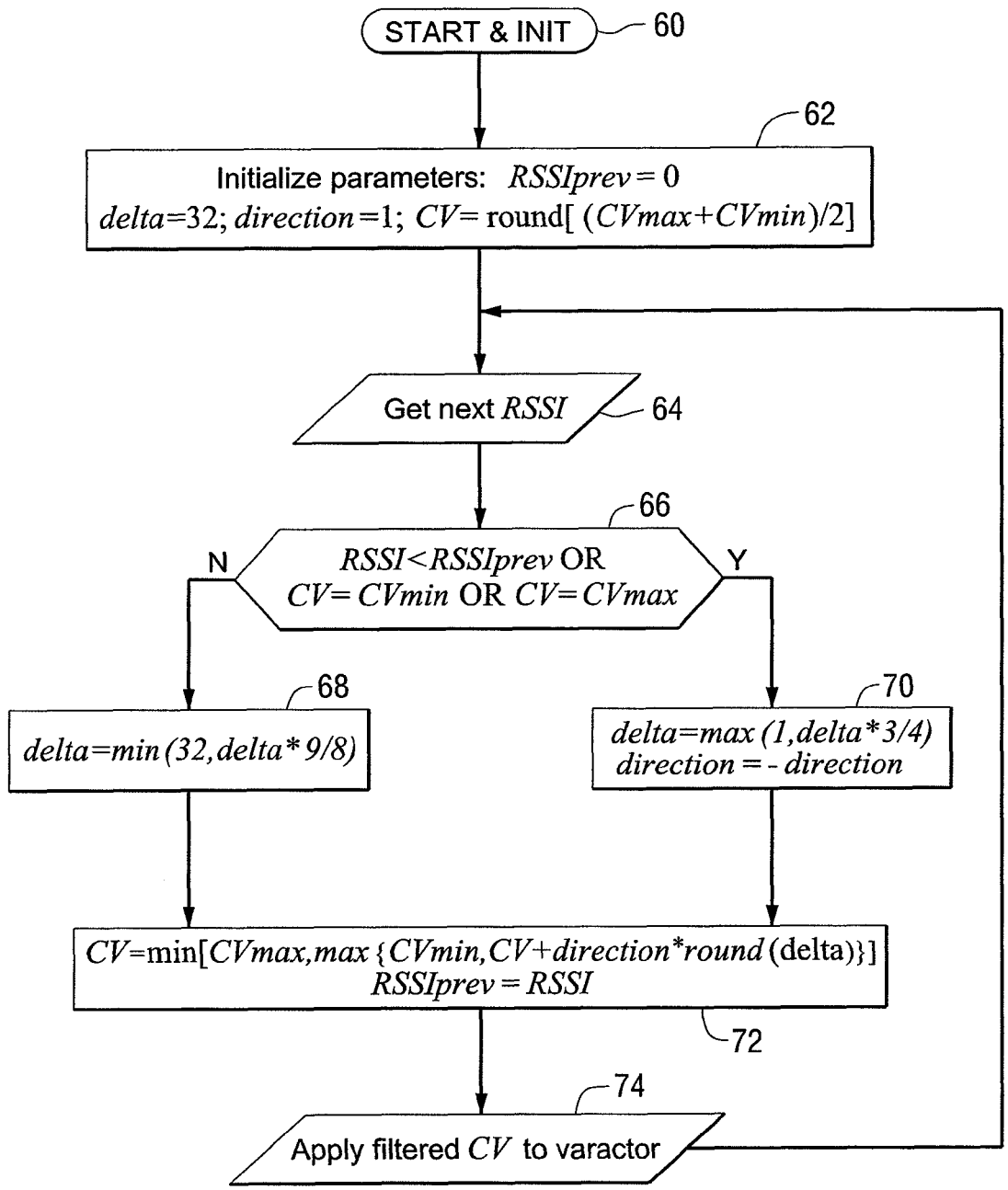
FIG. 7 is a flow diagram of a method of producing a control voltage.

A flowchart of the above algorithm is shown in FIG. 7. The algorithm starts as in block 60 and initializes the starting parameters as shown in block 62. Block 64 shows that the next RSSI is retrieved. Then the RSSI is evaluated to determine if certain conditions are met, as in block 66. If the conditions are not met, then a value is assigned to delta in block 68. If the conditions are met, then a different value is assigned to delta and the direction is changed as in block 70. Thus the polarity of a next control voltage step can be determined based on a decrease in received signal strength indication, or based on control voltage minimum and maximum limits (to prevent a stuck condition). Then the value of CV is set and RSSIprev is set to RSSI as in block 72. Then block 74 shows that the CV is applied to the varactor, and the next RSSI is retrieved.

Consider the fixed-point resolution of RSSI. For example, RSSI can be computed on a log scale having 0.25 dB resolution. If successive signal level changes are small compared to the RSSI resolution, then the RSSI could remain constant. This could be due to a low Q circuit over that frequency range. Since there is not sufficient resolution for AIM to observe the RSSI decrease over this sequence, then the same direction will be maintained until RSSI decreases.

The "if" condition in the AIM algorithm shown in block 66 of FIG. 7 avoids the stuck conditions encountered when the Q is low, or when the CV reaches the endpoints. Changing direction requires either a drop in RSSI value, or the CV reaches its limit on one of the elastic boundaries CVmin or CVmax. Thus the RSSI quantization has a role in maintaining the same direction until the RSSI drops to a lower quantization value. The quantization step size of the RSSI should be set larger than the expected RSSI estimation noise. That is, the received signal strength indication is quantized with sufficient coarseness to suppress undesirable response to small received signal strength indication noise values. This "capture effect" enhances the algorithm's desirable response to the slope of the tuned circuit, rather than RSSI noise. An alternative to using RSSI quantization to combat noise is to use hysteresis. This has the benefit of being somewhat more precise. The hysteresis can be adapted to accommodate an arbitrary level of noise, and doesn't require coarse RSSI quantization. The hysteresis version is shown in the AIM algorithm below.

---

"AIM algorithm cycle, with RSSI hysteresis instead of quantization"
input RSSI
if ( RSSI < RSSIpeak − hysteresis ) OR ( CV = CV min ) OR ( CV = CV max )

$$\text{then delta} = \max\left(1, \frac{3}{4} \cdot \text{delta}\right)$$

direction = −direction
else $$\text{delta} = \min\left(\frac{\text{CVmax} - \text{CVmin}}{8}, \frac{9}{8} \cdot \text{delta}\right)$$

RSSIpeak = RSSI
CV = min(CVmax,max(CVmin,CV + direction · round ( delta ))).

---

In this example, the size of the increment or delta is adaptive to better accommodate the unknown Q, to speed-up acquisition, and to track a varying peak frequency due to changing parameters. The maximum value of delta is limited to ⅛ of the total range for this example, and this maximum value is also applied as the initial value. This limit prevents overly coarse CV resolution, and its initial value aids fast acquisition. The minimum value of delta is set to one, the finest achievable DAC resolution. The value of delta is adapted to accommodate an arbitrary Q of the tuned circuit. The adaptive delta also offers fast tracking when needed for acquisition, changing parameters, or low Q.

The value of delta is decreased when RSSI decreases, and the direction is reversed. This is because a decrease in RSSI is indicative of tuning away from the RSSI peak. The dither span and delta should be reduced after reversing direction since the dither about the peak should eventually be minimized for best performance, keeping the resonance peak close to the tuned frequency.

The value of delta is increased if the direction is not changed, which has the effect of decreasing the number of steps while dithering back and forth across the peak. This increase is useful in improving the ability to track parameter changes, and adapt to low Q tuning.

The delta affects the average number of AIM cycles as it dithers, as this can affect the response time to changes in tuning parameters, e.g., caused by movement. Using the simple adaptive rules for delta, it approaches a value such that the dither requires several AIM cycles to traverse the peak in each direction, regardless of Q, and in the absence of RSSI noise. A "dither cycle" is defined to be a CV traversal in both directions. This dither cycle starts with an AIM cycle enforcing a direction change, it traverses the dither span for another direction change, and then ends with the AIM cycle immediately prior to the next AIM direction change cycle. Also define a delta increase factor U (e.g., U=9/8 in the AIM algorithm example above), and a delta decrease factor D (e.g., D=¾ in the AIM algorithm example above). Both U and D affect the AIM response time to parameter changes, as well as dither sensitivity to noise. The U and D factors are adaptively controlled to ensure stability and a balance between response time and tracking accuracy.

Consider the minimum number of AIM cycles required in a dither cycle. A steady-state dither of 2 AIM cycles cannot be sustained. A dither cycle was previously defined to require exactly 2 direction-changing AIM cycles, so there would be no other AIM cycles. A direction reversal would be required at every AIM cycle, also requiring a persistent decrease in RSSI at every AIM cycle. This could happen only if the signal and noise power continue to decrease more than the RSSI resolution at each AIM cycle, and this is not steady state. However, this is a desirable response for a monotonically decreasing signal fade, since the CV remains in the same range as before the signal fade.

If the signal is monotonically increasing faster than the decrease in gain away from the tuning peak, as it recovers from a fade, for example, then the CV will continue to advance in the same direction. Although the signal gain is actually decreasing in this case, the RSSI is not decreasing, and the signal quality should be improving. Once the signal stops increasing, the CV will quickly find its way to the tuning peak.

It can be shown that a dither cycle can be sustained with 3 AIM cycles, but it is unstable since delta decreases to its lower limit. In one example, a dither cycle has been defined to require exactly 2 direction-changing AIM cycles, so the third AIM cycle must not change direction. Consider a perpetual deterministic dither cycle consisting of 3 AIM cycles (AIM1, AIM2 and AIM3), with corresponding RSSI1<RSSI3<RSSI2. The AIM1 cycle will decrease delta by factor D, because RSSI1<RSSI3. The AIM2 cycle will increase delta by factor U, because RSSI2>RSSI1. The AIM3 cycle will decrease delta by factor D, because RSSI3<RSSI2. Since this dither cycle consists of 2 AIM cycles decreasing delta by factor D, and a single AIM cycle increasing delta by factor U, then this deterministic dither cycle can be sustained if $D^2 \cdot U = 1$. If $D^2 \cdot U < 1$, then delta will continue to decrease at each dither cycle until it reaches its lower limit of one, and the dither cycle is broken. Conversely, if $D^2 \cdot U > 1$, then delta will continue to increase at each dither cycle until it reaches it maximum limit (e.g., CVmax/8) and the dither cycle is broken. However, whenever a dither cycle requires 4 or more AIM cycles due to changing parameters or noise, for example, the value of delta is increased over the previous dither cycle. Even if D·U=1, the occasional extra AIM cycles will eventually bring delta to its maximum limit, so it is too unstable to consider.

If the RSSI values are completely random due to large RSSI noise, and there is a 0.5 chance of changing directions for any single AIM cycle, then the number of AIM cycles that do not change direction is the same as the number that do change directions (i.e., 2 by definition). Then there are 4 AIM cycles per dither cycle, on average, in this random case. If D·U<1, then delta will continue to decrease at each dither cycle until it reaches its lower limit of one. Conversely, if D·U<1, then delta will continue to increase at each dither cycle until it reaches its maximum limit (e.g., CVmax/8). So it is important that D·U<1, especially considering that RSSI quantization tends to suppress direction changes and increases the rate of U.

The average number C of AIM cycles per dither cycle can be computed for an equilibrium condition where delta is maintained between its minimum and maximum values. Since a dither cycle requires exactly 2 direction-changing AIM cycles, then the remaining number of AIM cycles with no direction change must be C−2. The average value of delta at equilibrium is maintained if $U^{N-2} \cdot D^2 = 1$. Then the average number of AIM cycles per dither cycle is:

$$C = 2 \cdot \left(1 - \frac{\log(D)}{\log(U)}\right).$$

For this example, where U=⅞ and D=¾, C=6.885. Simulation and product testing have indicated that these values of U and D are appropriate to balance adaptation time (C) and noise immunity.

When delta reaches its minimum (e.g., one in this case), there is a possibility that it gets stuck in a dither limit cycle consisting of 4 AIM cycles, assuming D·U<1. This could be desirable, especially for high Q tuning.

When delta reaches its maximum, even temporarily, there is a possibility that it gets stuck in a dither limit cycle consisting of 6 AIM cycles. This is because the D factor of the first AIM cycle following a maxed-out delta value limits the product of the second pair of U factors by the first D factor. So the second U factor is reduced due to the limit on delta. The sequence is as follows:

RSSI1<RSSI0 resulting in the first D in the dither cycle
RSSI2>RSSI1 resulting in U
RSSI3>RSSI2 resulting in Ux, limited such that Ux*U=1/D.

The second half of the dither cycle is similar:
RSSI4<RSSI3 resulting in the second D in the dither cycle
RSSI5>RSSI4 resulting in U
RSSI6>RSSI5 resulting in Ux, limited such that Ux*U=1/D.

Therefore, to prevent this undesirable limit cycle case, impose the condition $U^2 \cdot D < 1$.

The values used in this example (U=⅞, D=¾) satisfy the inequality ($U^2 \cdot D = 243/256$).

The value of delta should have sufficient precision to prevent truncation or limiting after multiplication with the increase or decrease factors. This effect is similar to the finite-precision effects of fixed-point infinite impulse response (IIR) filters. In this example, delta should have a precision of ⅛, or finer, to avoid finite-precision effects.

AIM Simulation

Figure 8:
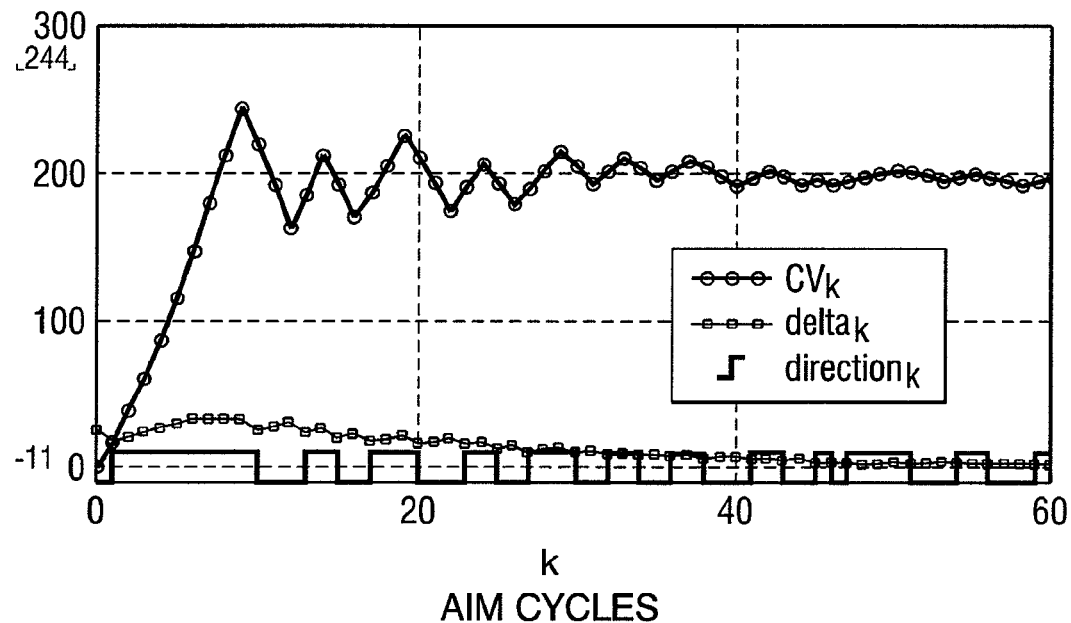
FIG. 8 is a graph of control voltage, delta, and direction versus adaptive impedance matching cycles.
Figure 9:
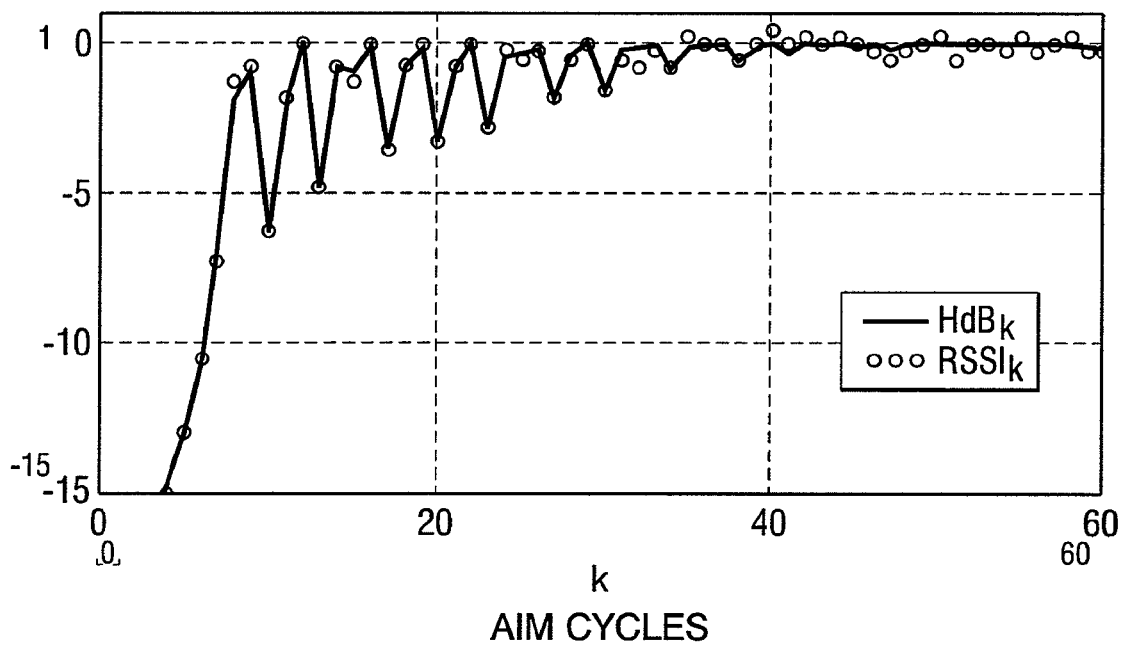
FIG. 9 is a graph of a filter gain and received signal strength indication versus adaptive impedance matching cycles.

Results of a simulation of the AIM algorithm are shown in FIGS. 8 and 9. FIG. 8 illustrates a simulation of the AIM algorithm with plots of CV, delta, and direction variables over a span of 60 AIM cycles. FIG. 9 illustrates a simulation of the AIM algorithm with plots of filter gain HdB and RSSI variables over a span of 60 AIM cycles. In the simulation, a tuned circuit, representative of a loop antenna with a modest Q of 10, was tuned with a varactor diode. It was controlled by an 8-bit DAC with AIM feedback control value CV. Gaussian noise was added to the RSSI samples to simulate estimation error. This noise has a standard deviation of 0.25 dB, which is equal to the RSSI resolution. The desired tuning frequency was set such that a CV value of 200 would tune it to resonance. The initial CV value at the start of the algorithm was set to zero, so one can observe how the algorithm reacts to a large initial mistuning, similar to tuning and acquisition of a new channel frequency.

FIG. 8 shows plots of 3 variables: CV, delta, and direction. Starting from an initial value of zero, CV reaches the 200 target within 8 AIM cycles. It overshoots the 200 value and continues to dither about that target with decreasing dither span. The value of delta starts at 32, then continues to decrease as CV dithers about its target value of 200. The direction variable is also shown for its obvious effect on CV. The plots of FIG. 9 show the effect of CV on the tuned circuit gain HdB, as well as its quantized and noisy estimate, RSSI. The initial mistuning has a gain loss of over 15 dB. The gain loss is quickly minimized after dither convergence on the target; then the loss eventually is limited to a fraction of a dB.

AGC Interaction

Care must be taken to control AIM interaction with an automatic gain control (AGC). Since AIM uses RSSI as a metric, there is potential interaction with an AGC, which also uses some kind of RSSI metric. These interactions should be examined for any receiver design, and the solution for both may be somewhat synergistic. In one example, the AIM computation cycle is disabled when the receiver automatic gain control (AGC) adjusts its gain. This prevents unwanted interaction between AGC and AIM algorithms.

Ideally the AGC control voltage (or AGC information) is used for RSSI estimation, so AGC should not have a significant effect on AIM performance. This AGC control information alone may be sufficient for RSSI, although further estimation of the signal level after AGC adjustment may also be useful if the AGC control is not "tight". Some receivers may employ autonomous continuous AGC ahead of the RSSI estimation, and the AGC information may not be available for RSSI estimation. In this case, the update rate of the AIM cycles should be shorter than the AGC time constant. This should prevent or minimize the effects of the AGC that would tend to cancel the gain changes due to AIM tuning.

Some receivers use step-controlled AGC, where a DAC-like attenuator is under digital control. If accurate information on this step AGC control is available for RSSI estimation, then this AGC should have minimal effect on AIM performance, assuming RSSI is compensated for AGC gain. Alternatively, it may be simpler to avoid AGC effects by temporarily disabling AIM whenever an AGC gain change is imposed. It is important to consider that when the AGC gain is updated, instead of AIM, then this actually consumes 2 AIM cycles instead of one because the differential RSSI is the metric.

Figure 10:
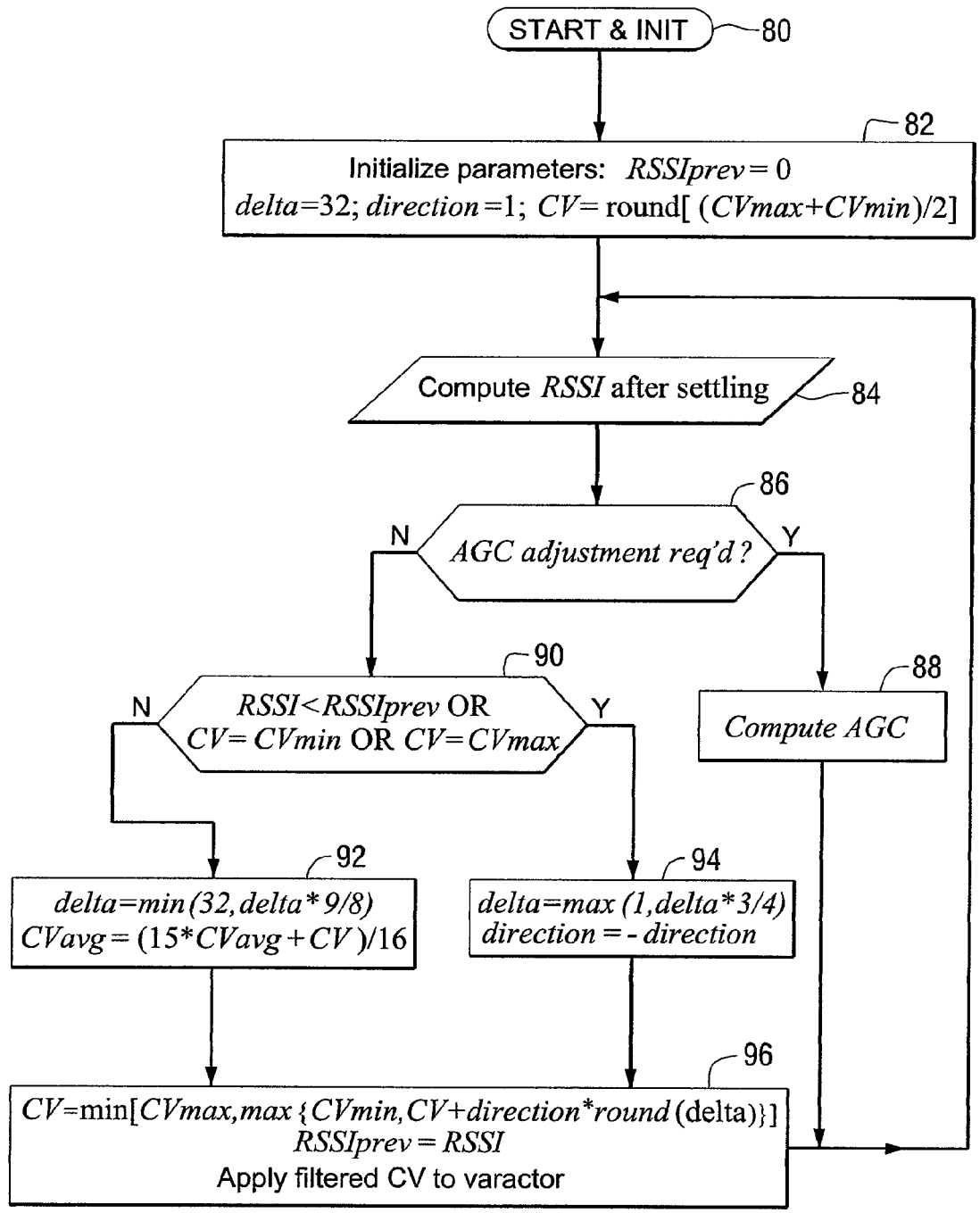
FIG. 10 is a flow diagram of an adaptive impedance matching/automatic gain control update cycle.

The flowchart of FIG. 10 shows how a receiver can disable an AIM cycle whenever an AGC action is needed. The algorithm starts as in block 80 and initializes the starting parameters as shown in block 82. Block 84 shows that the next RSSI is computed after a settling time. Next a determination is made as to whether an AGC adjustment is needed in block 86. If so, the AGC is computed in block 88 and the RSSI is computed again. If an AGC adjustment is not needed, the RSSI is evaluated to determine if certain conditions are met, as in block 90. If the conditions are not met, then a value is assigned to delta and the average CV is determined in block 92. If the conditions are met, then a value is assigned to delta and the direction is changed as in block 94. Then the value of CV is set, RSSIprev is set to RSSI and the CV is applied to the varactor as shown in block 96.

AIM Initialization and Auto-Calibration

If there is no information available to the receiver regarding the preferred CV value for a tuned frequency, then CV should be initialized to the center of the band. When tuning to a new frequency channel, instead of using a default center control voltage value, the initial control voltage value is determined from previously filtered control voltage values when this frequency was previously tuned. If the receiver uses presets to store favorite stations, for example, then the initial CV for any preset frequency could be stored with the preset. The stored preset CV could be the last CV used for that frequency. When tuning to a new frequency channel, instead of using a default center control voltage value, the initial control voltage value can be determined from a known a priori relationship between tuned frequency and control voltage. A known a priori relationship between tuned frequency and control voltage can be refined and updated based on the latest filtered control voltage information for each tuned frequency.

Preferably, a filtered version of CV would be more accurate. An example of this filtered CV is CVavg, as computed in block 92 of the flowchart of FIG. 10. If the seek/scan function is used, it may be preferable to allow the CV to continue to track as the frequency is incremented, instead of initializing for each tuned frequency. This should function even for frequencies where no signal is available, since AIM operates on a signal or noise. However, if the scan rate is faster than the AIM cycle rate, then it may be beneficial for the receiver to use some approximate relationship between CV and tuned frequency.

AIM can also be used more as a preselector filter for receivers where the antenna characteristic is constant: some table-top receivers with loop antennas, for example. If the relationship between tuned frequency and CV is known a priori, then the initial CV value can be computed for each frequency. Furthermore, AIM can refine the accuracy after tuning to that frequency. The receiver could also use this CV refinement to update the CV versus frequency relationship. This feature replaces the need for a preselector varactor voltage that is derived from the LO voltage for superheterodyne receivers.

The Adaptive Impedance Matching (AIM) technique described herein provides a means for improving the signal gain of electrically small antennas, and can be implemented in a digital radio receiver. Although AIM is designed to enhance the reception of AM and FM broadcast signals, including HD Radio signals, the technology is not limited to AM or FM broadcast receivers.

While the invention has been described in terms of several examples, it will be apparent to those skilled in the art that various changes can be made to the disclosed examples without departing from the scope of the invention as defined by the following claims. The implementations described above and other implementations are within the scope of the claims.

What is claimed is:

1. A method of tuning an antenna circuit, comprising:
   (a) receiving a signal on an antenna;
   (b) producing a received signal strength indication based on the received signal;
   (c) using the received signal strength indication to produce a control voltage;
   (d) using the control voltage to control a capacitance in an antenna matching circuit;
   (e) changing the control voltage to minimize a ratio of a change in the received signal strength indication to a change in the control voltage; and
   (f) repeating steps (a), (b), (c), (d) and (e).

2. The method of claim 1, wherein the step of using the received signal strength indication to produce the control voltage changes the control voltage by an increment that is adaptively adjusted.

3. The method of claim 2, wherein the increment is adjusted based on whether there is a control voltage direction change.

4. The method of claim 2, wherein the polarity of the increment is determined based on a decrease in received signal strength indication.

5. The method of claim 2, wherein the polarity of the increment is based on whether the control voltage has reached a minimum limit or a maximum limit.

6. The method of claim 2, wherein the step of using the received signal strength indication to produce the control voltage changes the control voltage by multiplying the control voltage by an increase factor or a decrease factor, wherein the increase factor and the decrease factor are adaptively controlled.

7. The method of claim 1, wherein the received signal strength indication is quantized with sufficient coarseness to suppress variations in received signal strength indication noise values.

8. The method of claim 1, wherein the step of changing the control voltage to minimize a ratio of a change in the received signal strength indication to a change in the control voltage uses an heuristic approximation to minimize the ratio of a change in the received signal strength indication to a change in the control voltage.

9. The method of claim 1, wherein step (f) is disabled when an automatic gain control adjusts its gain.

10. The method of claim 1, wherein the step of using the received signal strength indication to produce the control voltage uses an initial control voltage value determined from a previously filtered control voltage value.

11. The method of claim 10, wherein the initial control voltage value is stored with a channel preset.

12. The method of claim 10, wherein the initial control voltage value is determined from a known a priori relationship between a tuned frequency and the control voltage.

13. The method of claim 12, wherein the known a priori relationship between the tuned frequency and the control voltage is updated based on filtered control voltage information for each of a plurality of tuned frequencies.

14. The method of claim 1, wherein the step of using the control voltage to control a capacitance in an antenna matching circuit comprises:
   producing a digital control signal;
   applying the digital control signal to a digital-to-analog converter to produce the control voltage; and
   applying the control voltage to a varactor.

15. The method of claim 14, further comprising:
   filtering the control voltage prior to applying the control voltage to the varactor.

16. The method of claim 1, wherein the received signal strength indication is estimated by a baseband processor.

17. The method of claim 1, wherein the received signal strength indication is estimated by computing an approximately instantaneous power of the received signal in a digital signal processor.

18. The method of claim 1, wherein the received signal strength indication is estimated by a detector in an analog automatic gain control circuit.

19. The method of claim 1, wherein the received signal strength indication includes samples that are computed over discrete time intervals.

20. The method of claim 1, wherein:
the control voltage is updated in a plurality of cycles; and
wherein for each cycle, the received signal strength indication is produced at the start of each cycle, the control voltage is produced, the control voltage is filtered and applied to varactor diodes, a remaining portion of the cycle allows for settling time of control voltage filtering.

21. The method of claim 1, wherein the received signal strength indication is adjusted using hysteresis.

22. The method of claim 1, wherein the control voltage is dithered, resulting in variations of the received signal strength indication about its peak value.

23. The method of claim 1, wherein the received signal strength indication includes samples computed in dB as a log of a sum of energies of received signal samples.

24. The method of claim 1, wherein the control voltage is varied such that an expected value of a derivative of the received signal strength indication with respect to the control voltage approaches zero.

25. An apparatus, comprising:
an antenna;
a circuit for producing a received signal strength indication based on the received signal;
a processor for using the received signal strength indication to produce a control voltage; and
an antenna matching circuit including a capacitance controlled by the control voltage;
wherein the processor changes the control voltage to maximize signal gain by minimizing a ratio of a change in the received signal strength indication to a change in the control voltage.

26. The apparatus of claim 25, wherein the processor changes the control voltage by an increment that is adaptively adjusted.

27. The apparatus of claim 26, wherein the increment is adjusted based on whether there is a control voltage direction change.

28. The apparatus of claim 26, wherein the polarity of the increment is determined based on a decrease in received signal strength indication.

29. The apparatus of claim 26, wherein the polarity of the increment is based on whether the control voltage has reached a minimum limit or a maximum limit.

30. The apparatus of claim 25, wherein the processor multiplies the control voltage by an increase factor or a decrease factor, wherein the increase factor and the decrease factor are adaptively controlled.

31. The apparatus of claim 25, wherein the received signal strength indication is quantized with sufficient coarseness to suppress variations in received signal strength indication noise values.

32. The apparatus of claim 25, wherein the processor uses an heuristic approximation to minimize the ratio of a change in the received signal strength indication to a change in the control voltage.

33. The apparatus of claim 25, wherein the processor uses an initial control voltage value determined from a previously filtered control voltage value.

34. The apparatus of claim 33, wherein the initial control voltage value is stored with a channel preset.

35. The apparatus of claim 25, wherein the processor uses an initial control voltage determined from a known a priori relationship between a tuned frequency and the control voltage.

36. The apparatus of claim 35, wherein the known a priori relationship between the tuned frequency and the control voltage is updated based on filtered control voltage information for each of a plurality of tuned frequencies.

37. The apparatus of claim 25, further comprising:
a digital-to-analog converter receiving a control signal from the processor and producing the control voltage.

38. The apparatus of claim 37, further comprising:
a filter for filtering the control voltage.

39. The apparatus of claim 38, wherein the control voltage is updated in a plurality of cycles and wherein for each cycle, the received signal strength indication is produced at the start of the cycle, the control voltage is produced, the control voltage is filtered and applied to varactor diodes, and a remaining portion of the cycle allows for settling time of control voltage filtering.

40. The apparatus of claim 25, wherein the processor comprises a baseband processor.

41. The apparatus of claim 25, wherein the received signal strength indication includes samples computed over discrete time intervals.

42. The apparatus of claim 25, wherein the received signal strength indication is quantized using hysteresis.

43. An apparatus comprising:
means for receiving a signal on an antenna;
means for producing a received signal strength indication based on the received signal;
means for using the received signal strength indication to produce a control voltage; and
means for using the control voltage to control a capacitance in an antenna matching circuit;
wherein the means for using the received signal strength indication to produce a control voltage changes the control voltage to maximize signal gain by minimizing a ratio of a change in the received signal strength indication to a change in the control voltage.

* * * * *